(12) United States Patent
Ingram et al.

(10) Patent No.: US 8,478,947 B2
(45) Date of Patent: Jul. 2, 2013

(54) MEMORY CONTROLLER

(75) Inventors: Graeme Leslie Ingram, Cherry Hinton (GB); Ian James Quinn, Cherry Hinton (GB)

(73) Assignee: ARM Limited, Cambridge (GB)

( * ) Notice: Subject to any disclaimer, the term of this patent is extended or adjusted under 35 U.S.C. 154(b) by 1557 days.

(21) Appl. No.: 11/173,156

(22) Filed: Jul. 5, 2005

(65) Prior Publication Data

US 2007/0011409 A1 Jan. 11, 2007

(51) Int. Cl.
*G06F 13/00* (2006.01)

(52) U.S. Cl.
USPC .................. 711/154; 711/167; 711/E12.052

(58) Field of Classification Search
None
See application file for complete search history.

(56) References Cited

U.S. PATENT DOCUMENTS

| | | | | |
|---|---|---|---|---|
| 5,218,686 A | * | 6/1993 | Thayer ........................... | 711/100 |
| 5,860,106 A | * | 1/1999 | Domen et al. ................. | 713/324 |
| 6,944,731 B2 | * | 9/2005 | Bouchard et al. ............. | 711/161 |
| 7,266,667 B2 | * | 9/2007 | Oh ................................. | 711/200 |
| 2005/0081002 A1 | * | 4/2005 | Chang et al. .................. | 711/154 |

* cited by examiner

*Primary Examiner* — Reginald Bragdon
*Assistant Examiner* — Eric Loonan
(74) *Attorney, Agent, or Firm* — Nixon & Vanderhye P.C.

(57) ABSTRACT

A method of controlling a memory and a memory controller are disclosed. The memory controller is operable to control a memory, the memory being operable in a plurality of modes, the memory controller comprising: memory interface logic configurable to interact with the memory in each of the plurality of modes; and memory mode change logic operable, in response to a memory mode change request instruction specifying a predetermined one the plurality of modes being issued by the memory interface logic to the memory, to request the memory interface logic to be configured to interact with the memory in the predetermined one of the plurality of modes and to prevent interaction between the memory interface logic and the memory until the memory interface logic confirms that it is configured to interact with the memory in the predetermined one of the plurality of modes. In this way, it will be appreciated that both the memory and the memory controller can be reconfigured to operate in a different mode using a single instruction which provides performance benefits, increases reliability and reduces infrastructure requirements.

29 Claims, 3 Drawing Sheets

MEMORY CONTROLLER

FIELD OF THE INVENTION

The present invention relates to memory controllers. Embodiments of the present invention relate to memory controllers for memories which support a plurality of modes.

DESCRIPTION OF THE PRIOR ART

Memory controllers are known. Such memory controllers generally provide an interface between a master unit, such as a core, and a slave memory. Slave memories typically can be operated in a variety of modes, dependent on, for example, the fabrication technology of the memory, the memory design, its architecture or the architecture of any interface provided by that memory. Also, to enable memories to inter-operate with legacy systems, modern memories will typically by required to operate in particular modes in order to ensure backward compatibility with those legacy systems. This inter-operability requirement typically manifests in interface standards which modern memories are required to comply with.

As the variety and types of memory increase, the design and operation of any memory controller to support these memories becomes more problematic. Accordingly, it is desired to provide an improved memory controller.

SUMMARY OF THE INVENTION

According to one aspect of the present invention there is provided, a memory controller operable to control a memory, the memory being operable in a plurality of modes, the memory controller comprising: memory interface logic configurable to interact with the memory in each of the plurality of modes; and memory mode change logic operable, in response to a memory mode change request instruction specifying a predetermined one the plurality of modes being issued by the memory interface logic to the memory, to request the memory interface logic to be configured to interact with the memory in the predetermined one of the plurality of modes and to prevent interaction between the memory interface logic and the memory until the memory interface logic confirms that it is configured to interact with the memory in the predetermined one of the plurality of modes.

The present invention recognises that a situation can occur whereby the operating mode of a memory and the operating mode of the memory controller may diverge. As a result, the memory controller will become unable to interact with that memory and that memory will similarly be unable to interact with that memory controller. It will be appreciated that this can potentially have disastrous consequences and can significantly impact upon the performance of any data processing apparatus which includes such a memory controller and memory.

To illustrate this problem, consider the following example. A data processing apparatus includes a memory controller which is coupled with a static RAM (SRAM), and the SRAM supports both synchronous and asynchronous modes; the memory controller also supports both synchronous and asynchronous modes. The SRAM contains boot software for the data processing apparatus. When the data processing apparatus is initiated the SRAM will, for legacy and backward compatibility reasons, initially operate in the asynchronous mode. Accordingly, the memory controller must also initially communicate with the SRAM in the asynchronous mode. On initiation, data processing apparatus will initiate a data access to the SRAM in order to load the boot software.

However, because the SRAM is operating in asynchronous mode this process is slow. Hence, if improved performance is required, there is a need to switch the SRAM and the memory controller to the synchronous mode. Accordingly, the boot software retrieved from the SRAM must contain a plurality of commands which cause the SRAM and the controller to switch from the asynchronous to the synchronous mode.

Initial commands will cause the SRAM to switch to the synchronous mode. It will be appreciated that the memory controller is now unable to access the SRAM because they are operating in different modes. Accordingly, subsequent commands will then cause the memory controller to also switch to the synchronous mode.

It will be appreciated that if the memory controller were switched to the synchronous mode before the SRAM is switched to the synchronous mode then the commands to cause the SRAM to switch to the synchronous mode would not be able to be provided to the SRAM because the memory controller and the SRAM will be operating in different modes. If all the commands required to cause the change in mode have not been retrieved from the SRAM prior to the change in mode being initiated then it will be appreciated that the change in mode can not be completed. Accordingly, in order to ensure a reliable change of mode, it is necessary to retrieve all of the commands to required cause the change in mode from the SRAM prior to their execution. This ensures that the switch of mode does not start and then fail to compete because the required instructions to complete the switch in mode are in a memory which is no longer accessible.

Hence, it is necessary to store the commands which perform the change in mode into, typically, a RAM. Also, the boot software retrieved from the SRAM needs to include extra code which enables the commands to effect a change in the mode to be retrieved and stored in that RAM, causes the commands to effect a change in the mode to be executed from the RAM and then branches back to the boot software being retrieved from the SRAM. It will be appreciated that this process considerably slows the operation of the data processing apparatus and also requires that a RAM is provided.

Accordingly, the present invention provides memory interface logic which is configurable to interact with the memory in any one of a plurality of modes. Also, memory mode change logic is provided. The memory mode change logic responds to a memory mode change request instruction being issued by the memory interface logic to the memory. The memory mode change request instruction specifies that the memory should operate in a predetermined one of those modes. The memory mode change logic responds by requesting that the memory interface logic is configured to interact with the memory in that predetermined mode. The memory mode change logic also prevents any interaction between the memory interface logic and the memory until it is confirmed that the memory interface logic is configured to operate in the predetermined mode.

In this way, it will be appreciated that both the memory and the memory controller can be reconfigured to operate in a different mode using a single instruction. Because a single instruction causes both the memory and the memory controller to be configured there is no need to provide a RAM into which that instruction should be stored. Also, there is no need to provide any additional code to cause that instruction to be stored into that RAM or to control program flow to branch to that RAM and back again, which considerably improves the performance of the mode change. Furthermore, preventing interaction between the memory interface logic and the memory until the memory interface logic has been reconfigured helps to ensure reliable operation of any instructions accessing the memory.

In one embodiment, the memory controller further comprises a buffer operable to continue to receive further instructions whilst the memory interface logic is being configured to interact with the memory in the predetermined one of the plurality of modes.

Accordingly, the performance impact of the reconfiguration is further minimised since instructions can continue to be received whilst the reconfiguration takes place.

In one embodiment, the memory mode change logic is operable to prevent interaction between the memory interface logic and the memory by preventing communication between the memory interface logic and the memory until the memory interface logic confirms that it is configured to interact with the memory in the predetermined one of the plurality of modes.

Accordingly, all communication with that memory is stopped until both that memory and the memory interface logic are operating in the same mode.

In one embodiment, the memory interface logic comprises an interface configuration register operable to store parameters which configure the memory interface logic to interact with the memory in one of the plurality of modes and a holding interface configuration register operable to store parameters associated with the predetermined one of the plurality of modes, the memory interface logic being responsive to the request from the memory mode change logic to cause the parameters of the holding interface configuration register to be transferred into the interface configuration register to cause the memory interface logic to be configured to interact with the memory in the predetermined one of the plurality of modes.

Hence, the configuration of the memory interface logic is specified by the interface configuration register which stores the necessary parameters to enable the memory interface logic to operate in its present mode. A holding interface configuration register is provided which stores parameters which will enable the memory interface logic to operate in the predetermined mode. When the memory mode change request instruction is issued by the memory interface logic, the contents of the holding interface configuration register are copied into the interface configuration register. This provides an efficient mechanism to cause the memory interface logic to be reconfigured to support the predetermined mode.

In one embodiment, the memory interface logic is operable to provide an indication to the memory mode change logic when the parameters of the holding interface configuration register have been transferred into the interface configuration register.

Hence, when the update of the interface configuration register occurs the memory interface logic can provide a confirmation that this process has completed.

In one embodiment, the memory mode change logic is operable when the indication is provided to re-enable interaction between the memory interface logic and the memory.

Accordingly, once the memory interface logic provides the confirmation that the reconfiguration has taken place, accesses between the memory interface logic and the memory can be restarted.

In one embodiment, the memory mode change logic is operable, on receipt of the memory mode change request instruction, to prevent the holding interface configuration register from being updated until the memory interface logic confirms that it is configured to interact with the memory in the predetermined one of the plurality of modes.

Accordingly, when a memory mode change request instruction is received by the memory controller, the contents of the holding interface configuration register are frozen until it is confirmed that the reconfiguration of the memory interface logic has occurred. In this way, it will be appreciated that it can be ensured that the interface configuration register is updated with the correct parameters.

In one embodiment, the memory mode change detection logic is operable to detect the memory mode change request instruction by matching a bit portion in that instruction.

Hence, the memory mode change request instruction can simply be detected by the presence of a predetermined bit portion in that instruction. This bit portion may be one or more bits of the encoded instruction.

In one embodiment, the memory mode change detection logic is operable to detect the memory mode change request instruction by matching a bit portion in data associated with that instruction.

Similarly, the presence of the memory mode change request instruction may be identified simply by the presence of a predetermined bit portion being identified in data associated with an instruction. The bit portion may be one or more bits within the data which, for example, match a predetermined key.

In one embodiment, the plurality of modes includes at least a synchronous and an asynchronous mode and the memory interface logic comprises an interface configuration register operable to store timing parameters which configure the memory interface logic to interact with the memory in one of the synchronous and the asynchronous modes and a holding interface configuration register operable to store timing parameters associated with the predetermined one of the synchronous and the asynchronous modes, the memory mode change logic being responsive to the memory mode change request instruction specifying a predetermined one of the synchronous and an asynchronous mode being issued by the memory interface logic to the memory to request the memory interface logic to cause the timing parameters of the holding interface configuration register to be transferred into the interface configuration register to cause the memory interface logic to be configured to interact with the memory in the predetermined one of the synchronous and the asynchronous modes.

Hence, when the predetermined mode includes one of a synchronous and an asynchronous mode the timing parameters which configure the memory interface logic to interact with the memory in either synchronous or the asynchronous mode are stored in the holding interface configuration register and, when the memory mode change request instruction is issued to the memory, the memory interface logic is reconfigured to support the specified mode.

In one embodiment, the memory mode change logic is operable, in response to the memory mode change request instruction specifying the predetermined one of the synchronous and the asynchronous modes being issued by the memory interface logic to the memory, to prevent any accesses between the memory interface logic and the memory until the memory interface logic confirms that it is configured to communicate with the memory in the predetermined one of the synchronous and the asynchronous modes.

In one embodiment, the memory mode change logic is operable, in response to the memory mode change request instruction specifying the predetermined one of the synchronous and the asynchronous modes being issued by the memory interface logic to the memory, to prevent any further instructions being issued by the memory interface logic to the memory until the memory interface logic confirms that it is configured to communicate with the memory in the predetermined one of the synchronous and the asynchronous modes.

In one embodiment, the memory mode change logic is operable, in response to the memory mode change request instruction specifying the predetermined one of the synchronous and the asynchronous modes being issued by the memory interface logic to the memory, to prevent any further instructions being issued by the memory interface logic by preventing any instructions following the memory mode change request instruction being issued from an instruction buffer to the memory interface logic until the memory interface logic confirms that it is configured to communicate with the memory in the predetermined one of the synchronous and the asynchronous modes.

In one embodiment, the memory mode change logic is operable, in response to the memory mode change request instruction specifying the predetermined one of the synchronous and the asynchronous modes being issued by the memory interface logic to the memory, to prevent any further data being received by the memory interface logic from the memory until the memory interface logic confirms that it is configured to communicate with the memory in the predetermined one of the synchronous and the asynchronous modes.

In one embodiment, the plurality of modes includes modes for controlling the format of memory transfers with respect to memory burst boundaries and the memory interface logic comprises an interface configuration register operable to store formatting parameters which configure the memory interface logic to interact with the memory in one of the modes and a holding interface configuration register operable to store formatting parameters associated with the predetermined one of the modes, the memory interface logic being responsive to the request from the memory mode change logic to cause the formatting parameters of the holding interface configuration register to be transferred into the interface configuration register to cause the memory interface logic to be configured to interact with the memory in the predetermined one of the modes.

Hence, the memory may also be able to support any number of other modes such as, for example, those which indicate the format of transfers with that memory. The parameters associated with that mode are held in the holding interface configuration register and are used to reconfigure the memory interface logic when the memory mode change request instructions is issued to the memory. The parameters may typically include information relating to the memory burst length, such as, for example, a predetermined number of bits or continuous, in addition to the width of the data.

In one embodiment, the memory interface logic is configurable to interact with a plurality of the memory, each of which being operable in any one of the plurality of modes and memory mode change logic is operable, in response to a memory mode change request instruction specifying a predetermined one the plurality of modes being issued by the memory interface logic to any one of the plurality of the memory, to request the memory interface logic to be configured to interact with the any one of the plurality of the memory in the predetermined one of the plurality of modes and to prevent interaction between the memory interface logic and the any one of the plurality of the memory until the memory interface logic confirms that it is configured to interact with the any one of the plurality of the memory in the predetermined one of the plurality of modes.

Accordingly, the memory controller can interact with a plurality of modes, each of which may have an associated interface configuration register such that each of the memories may be accessed in any mode.

In one embodiment, the memory is a static memory.

It will be appreciated that the static memory may include conventional SRAM, PSRAM, NOR memory or NAND memory.

According to another aspect of the present invention there is provided a memory controller for controlling a memory, the memory having a plurality of modes, the memory controller comprising: memory interface means for interacting with the memory in any one of the plurality of modes; and memory mode change means for requesting, in response to a memory mode change request instruction specifying a predetermined one the plurality of modes being issued by the memory interface logic to the memory, the memory interface logic to be configured to interact with the memory in the predetermined one of the plurality of modes and for preventing interaction between the memory interface logic and the memory until the memory interface logic confirms that it is configured to interact with the memory in the predetermined one of the plurality of modes.

According to a further aspect of the present invention there is provided a method of controlling a memory, the memory being operable in a plurality of modes, the method comprising: (i) requesting, in response to a memory mode change request instruction specifying a predetermined one the plurality of modes being issued by the memory interface logic to the memory, a memory interface logic be configured to interact with the memory in the predetermined one of the plurality of modes; and (ii) preventing interaction between the memory interface logic and the memory until the memory interface logic confirms that it is configured to interact with the memory in the predetermined one of the plurality of modes.

BRIEF DESCRIPTION OF THE DRAWINGS

Embodiments of the present invention will now be described with reference to the accompanying drawings, in which.

DESCRIPTION OF THE EMBODIMENTS

Figure 1:
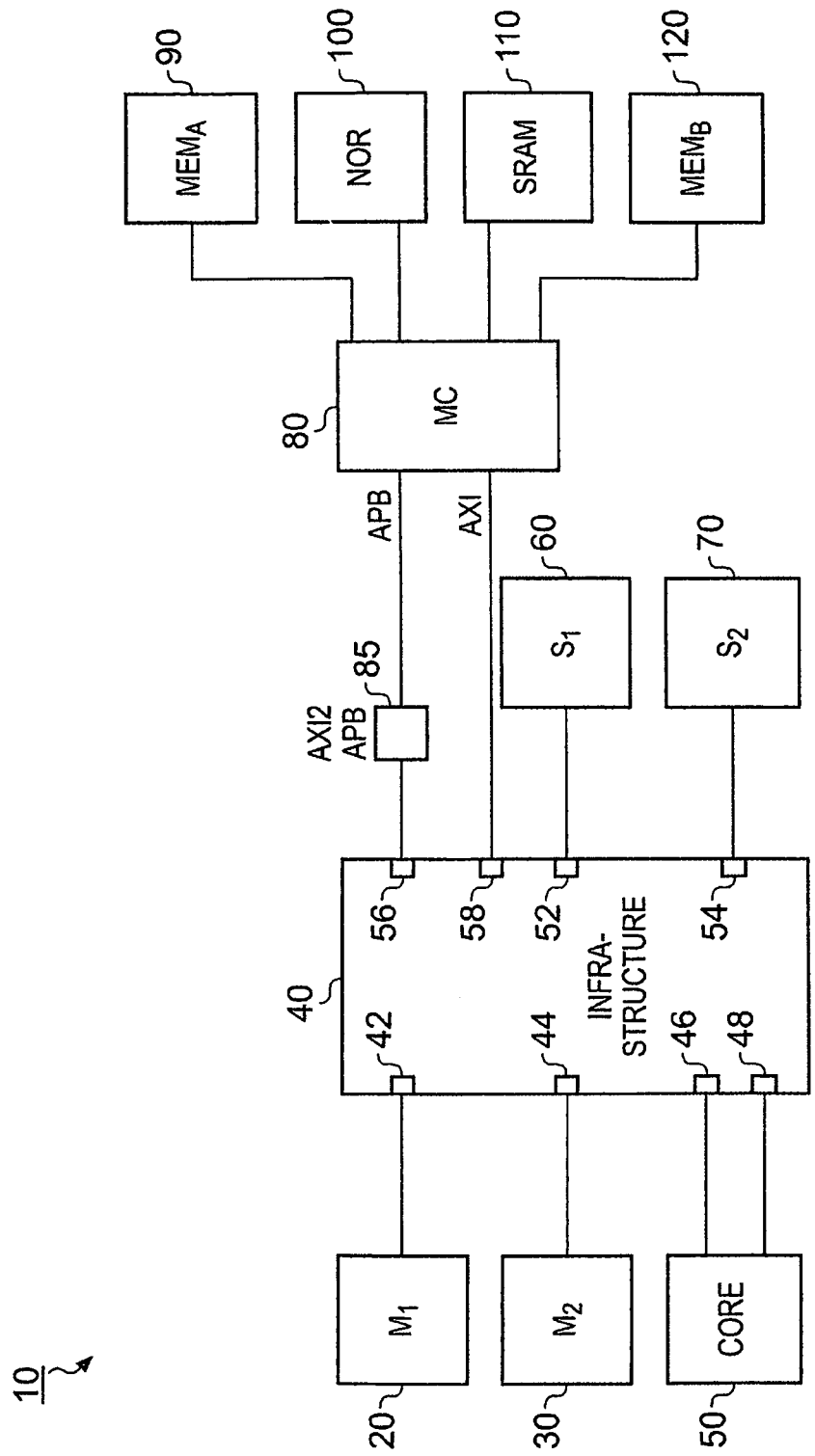
FIG. 1 illustrates a data processing apparatus incorporating a memory controller according to one embodiment of the present invention.

FIG. 1 illustrates a data processing apparatus, generally 10. The data processing apparatus 10 comprises a plurality of master units 20, 30, 50 coupled with a plurality of slave units 90, 100, 110, 120. The master units 20 and 30 are coupled with infrastructure logic 40. A further master unit, a core 50, is also coupled with the infrastructure logic 40. In this example, each master unit 20 and 30 is coupled with a respective slave port 42 and 44 of the infrastructure logic 40. The core 50 is coupled with two slave ports 46 and 48 of the infrastructure 42. Also coupled with the infrastructure logic 40 are two slave units 60 and 70, which are coupled to the infrastructure logic 40 via the master ports 52 and 54 respectively. Also coupled with the infrastructure logic 40 via the master ports 56 and 58 is a memory controller 80 according to one embodiment. Communication from the master ports 56 and 58 occurs in accordance with an AXI protocol. Accordingly, an AXI to APB decoder 85 is provided between the master port 56 and the memory controller 80. Coupled with the memory controller 80 are a plurality of memory devices including, in this example, a memory 90, a NOR memory 100, SRAM 110 and a memory 120. Whilst in this example arrangement these particular memories are provided, it will be appreciated that any range of memory devices may be provided.

Data transactions occur between the master units and the slave units of the data processing apparatus 10. The infrastructure logic 40 routes these data transactions.

When the data processing apparatus 10 is first initialised, the core 50 will typically be pre-arranged to access boot software stored in the NOR memory 100. It will be appreciated that because the NOR memory 100 is a non-volatile memory, the boot software will remain even when the data processing apparatus 10 is unpowered. To enable the boot software to be accessed, the NOR memory 100 will be allocated a predetermined memory address which is accessed by the core 50 on initialisation. For example, the NOR memory 100 may be allocated the address 0x0000 and the first instruction of the boot software will be stored at that memory location. The core 50 will, on initialisation, access memory address 0x0000.

On initialisation, the NOR memory 100 will, for legacy and interface standard requirements, initialise in an asynchronous mode. Accordingly, the memory controller 80 will initialise to interact with the NOR memory 100 also in an asynchronous mode. As mentioned previously, operating in the asynchronous mode is undesirable since the performance of the data transactions with the NOR memory 100 whilst in the asynchronous mode is poor in comparison to operating in, for example, a synchronous mode.

Hence, its is desirable to switch the NOR memory 100 and the memory controller 80 to the synchronous mode as soon as possible in order to improve performance. Accordingly, as will be explained in more detail below with reference to FIG. 2, the memory controller 80 is provided with an instruction which will cause the NOR memory 100 to operate in the synchronous mode and, when that instruction is issued from the memory controller 80 to the NOR memory 100, the memory controller 80 automatically switches to the synchronous mode. In this way, the issue of an instruction from the core 50 to the NOR memory 100 causes both the NOR memory 100 and the memory controller 80 to reconfigure to the required mode. Because the change in mode occurs in both devices in response to the same instruction, the reconfiguration occurs relatively quickly. Also, there is no need to provide a separate memory which would otherwise be required to store a whole sequence of instructions needed to separately configure the NOR memory 100 and the memory controller 80 to operate in the same mode.

Figure 2:
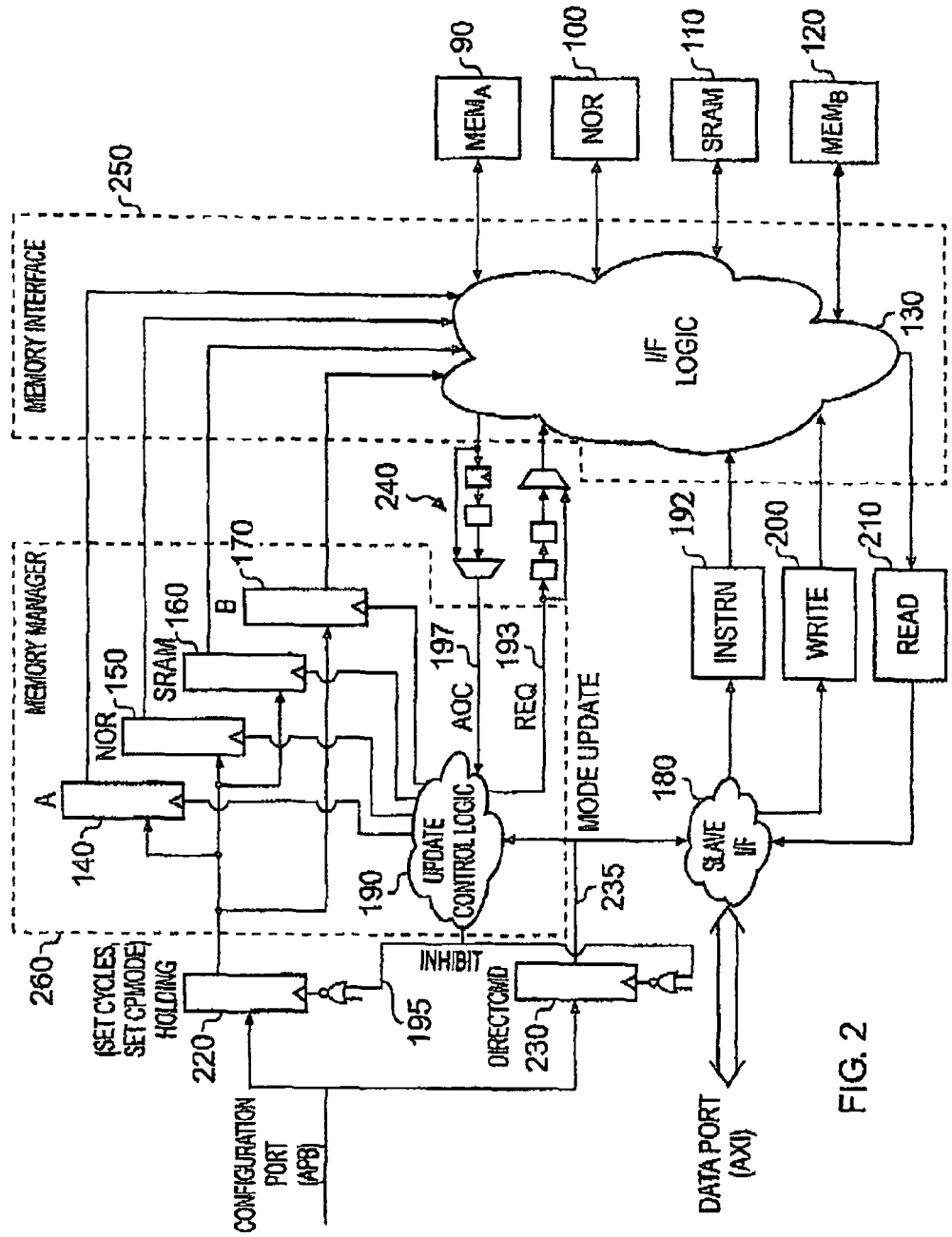
FIG. 2 illustrates in more detail the configuration of the memory controller illustrated in FIG. 1.

FIG. 2 illustrates in more detail the arrangement of the memory controller 80. Each of the memory devices 90, 100, 110, 120 is coupled with interface logic 130. The interface logic 130 supports communication with the memory devices 90, 100, 110, 120 in any of a variety of different modes. Each memory device 90, 100, 110, 120 may be configured to interact with the interface logic 130 in a different mode to the others. Hence, interface configuration registers 140, 150, 160 170 are provided which contain parameters which are used to configure or program the interface logic 130 to enable the interface logic 130 to support the particular mode of operation of the associated memory device 90, 100, 110, 120.

For example, if the memory device 90 is operating in a synchronous mode, the register 140 will store parameters which configure the interface logic 130 to communicate with the memory device 90 in the synchronous mode. Similarly, if the memory device 120 is operating in 16-bit asynchronous mode then the register 170 will be loaded with parameters which configure the interface logic 130 to communicate with the memory device 120 in that mode.

Data received over the data port from the master port 58 of the infrastructure logic 40 is routed via a slave interface 180 to the interface logic 130 and on to the specified memory device.

Provided between the slave interface 180 and the interface logic 130 are a number of FIFO buffers. An instruction FIFO 192 stores instructions to be issued to the memory devices, a write FIFO buffer 200 stores data to be written to the memory devices and a read 210 stores data read from the memory devices.

As will be explained in more detail below with reference to FIGS. 3A and 3B, when the operating mode of a memory device is to be changed, one or more commands are received over the APB bus which causes the configuration parameters for that mode to be stored in a holding register 220.

Thereafter, a further direct command is received over the APB bus which indicates that a mode change request instruction is to be issued to a memory device. The direct command may also contain instructions for the memory device as well indicating a required mode of operation. When a direct command is received which indicates that a mode change request instruction is to be issued to the memory device, registers in a direct command register 230 will be set to indicate that a mode change is to occur. At this point, a mode update signal is provided over the path 235 to the slave interface 180 and to update control logic 190. Should the direct command not contain an indication that a mode change request instruction is to be issued to the memory device then the direct command is passed through the data port.

When the mode update signal is asserted over the BUS 235 the update control logic 190 will assert an inhibit signal over the path 195 which prevents the contents of the holding register 220 and the direct command register 230 from being changed. Also, the update control logic 190 asserts a request signal over a path 193 to the interface logic 130.

On receipt of the request signal, the interface logic 130 will monitor whether the mode change instruction has yet been issued to the memory device. Instructions will continue to be issued to the memory device. Once the interface logic 130 has detected that the mode change instruction has been issued to the memory device, an acknowledgement signal is asserted over a path 197 to the update control logic 190.

On receipt of the acknowledgement signal, the update control logic 190 will enable a select port on a configuration register 140-170 associated with that memory device. Enabling the select port causes the parameters stored in the holding register 220 to be written into that register.

Meanwhile, the interface logic 130 will prevent any further transactions occurring with that particular memory device whilst the request signal and the acknowledgement signal are both asserted.

When the configuration register has been updated, the inhibit signal provided over the path 195 is cleared which enables the contents of the holding register 220 and the direct command register 230 to be updated by subsequent commands and the request signal provided over the path 193 is cleared.

Once the interface logic 130 receives an indication that the request signal is cleared then subsequent data transactions with that memory device are permitted to occur. Meanwhile, the memory device will have received the mode change instruction and will have reconfigured itself to operate in that new mode.

Synchronisation logic 240 is provided between the interface logic 130 and the update control logic 190 since these may be operating at different clock frequencies.

Whilst the use of two commands is described, it will be appreciated that these may be combined into a single command which causes both the holding register 220 to be loaded and the mode change request instruction to be issued to a memory device. For example, if the holding register 220 contained values used to update one configuration register and another configuration register needed updating in the same way then a further single direct command may issued to effect this change. However, for memories which are configured using data port memory configuration there would typically be at least two direct commands, one to set the holding register 220 and pass the key, and the second, through the data port, is a memory configuration instruction with data to be matched to the key, as will be explained in more detail below.

Figures 3A, 3B:
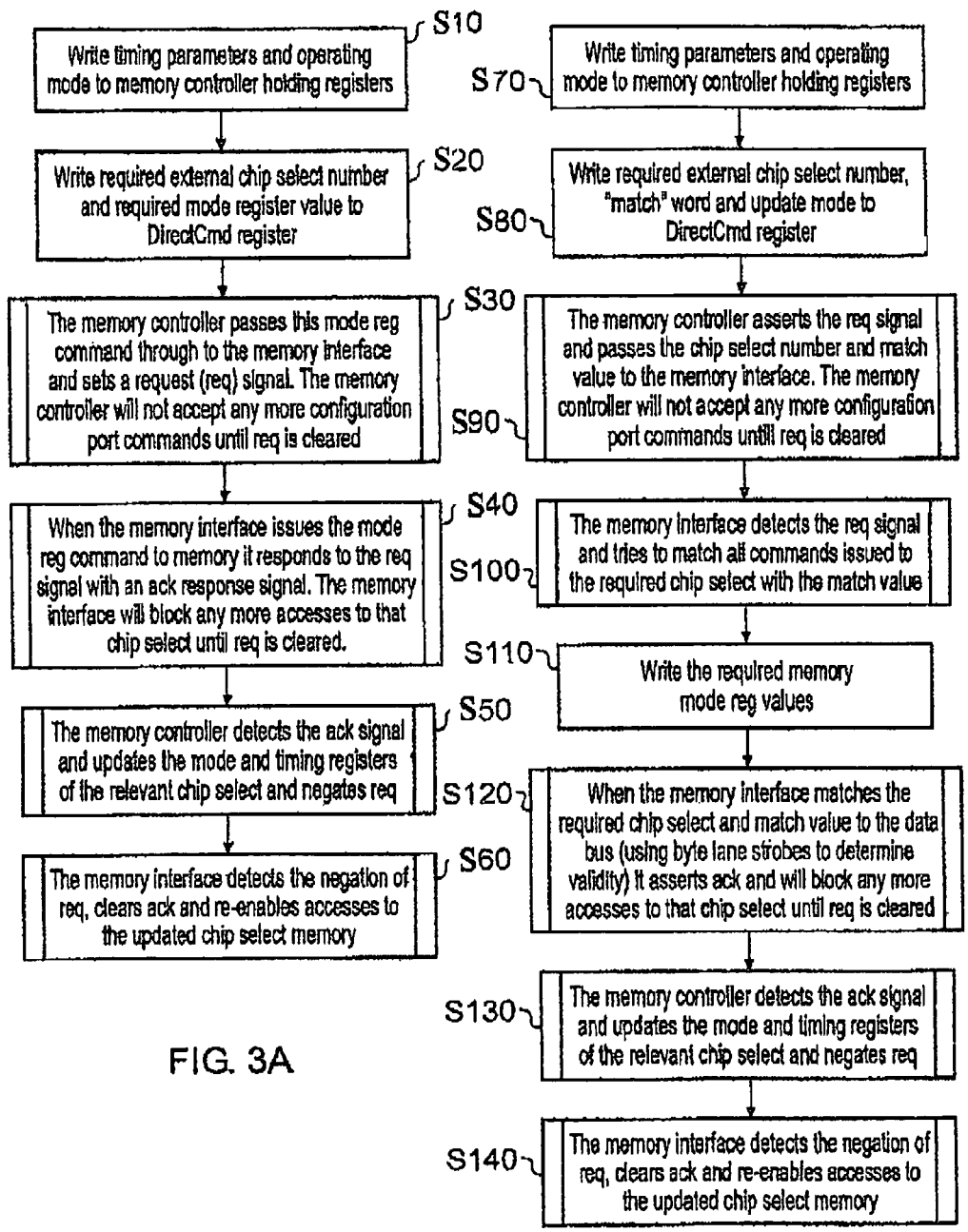
FIGS. 3A and 3B are flow diagrams illustrating in more detail the operation of the memory controller illustrated in FIG. 2.

FIGS. 3A and 3B are flow charts illustrating in more detail the operation of the memory controller 80 when a change in mode is to occur. The change in mode can occur as a result of one of two different mechanisms. The two mechanisms are provided for two different types of memory. The first mechanism is used for devices which are programmed using an address bus only, the second mechanism is used for devices which are programmed using both the address bus and a data bus. In the first mechanism, illustrated in FIG. 3A, a memory change instruction in the form of direct command is provided. In the alternative mechanism, illustrated in FIG. 3B, a memory change instruction in the form of data is provided.

As illustrated in FIG. 3A, at step S10, a direct command is received at the configuration port which causes timing parameters and operating mode parameters to be written to the holding register 220.

At step S20, another direct command is received at the configuration port which causes an identifier of the required memory device and a mode associated therewith to be written to the direct command register 230.

At step S30, the direct command indicating the required mode is passed from the direct command register 230 through the slave interface 180 and onto the interface logic 130. Also, the update control logic 190 will assert the inhibit signal to prevent the contents of the direct command register 230 and the holding register 220 form being changed. The request signal is asserted to alert the interface logic 130 that a change mode instruction will be issued.

At step S40, when the interface logic 130 issues the mode change instruction to the memory, an acknowledgement signal is asserted over the path 197. Thereafter, the interface logic 130 will block any further data transactions with that memory device until the request signal is cleared.

At step S50, the update control logic 190 detects the presence of the acknowledgement signal and transfers the parameters from the holding register 220 to the configuration register associated with that memory device. Also, the request signal is cleared, as is the inhibit signal.

At step S60, the interface logic 130 detects the clearing of the request signal, this causes the acknowledgement signal also to be cleared and transactions with the memory device may then continue.

It will be appreciated that throughout this process any data transactions with any other memory device may proceed uninterrupted.

FIG. 3B illustrates the alternative mechanism for enabling the mode change to occur. At step S70, a direct command is received at the configuration port which causes timing parameters and operating mode parameters to be written to the holding register 220.

At step S80, another direct command is received at the configuration port which causes an identifier of the required memory device and a key or match word associated with a mode change instruction to be written to the direct command register 230, the key or match word may be either a byte or a half word. It will be appreciated that this is possible in arrangements where all memory mode change request instructions only use the least significant byte of access.

At step S90, the key is passed form the direct command register 230 through the slave interface 180 and onto the interface logic 130. Also, the update control logic 190 will assert the inhibit signal to prevent the contents of the direct command register 230 and the holding register 220 form being changed. The request signal is asserted to alert the interface logic 130 that a change mode instruction will be issued.

At step S100, the interface logic 130 will attempt to match all commands issued to the memory with the key.

At step S110, mode change instructions are issued to the memory. These instructions update registers used to control the mode of operation of that memory. These mode change instructions do not affect the operation of the interface between the memory and the interface logic 130, but alter the internal characteristics of the memory.

At step S120, once a match occurs indicating that the final mode change instruction has been issued to the memory, an acknowledgement signal is asserted over the path 197. Thereafter, the interface logic 130 will block any further data transactions with that memory device until the request signal is cleared.

At step S130, the update control logic 190 detects the presence of the acknowledgement signal and transfers the parameters from the holding register 220 to the configuration register associated with that memory device. Also, the request signal is cleared, as is the inhibit signal.

At step S140, the interface logic 130 detects the clearing of the request signal, this causes the acknowledgement signal also to be cleared and transactions with the memory device may then continue.

It will be appreciated that throughout these processes any data transactions with any other memory device may proceed uninterrupted.

Accordingly, techniques are provided which enable reconfiguration of both the memory and the memory controller to be initialised and automatically completed using a single instruction. Because a single instruction causes both the memory and the memory controller to be configured there is no need to provide a RAM into which that instruction should be stored it can instead by directly retrieved and executed by, for example, a core. Hence, there is no need to provide any additional code to cause instructions used to reconfigure the memory and memory controller to be stored into that RAM or to control program flow to branch to that RAM and back again which considerably improves the performance of the mode change. Furthermore, preventing interaction between the memory interface logic and the memory until the memory interface logic has been reconfigured helps to ensure reliable operation of any instructions accessing the memory.

Although particular embodiments of the invention have been described herein, it will be apparent that the invention is not limited thereto, and that many modifications and additions may be made within the scope of the invention. For example, various combinations of features of the following dependent claims could be made with the features of the independent claims without departing from the scope of the present invention.

We claim:

1. A memory controller for controlling a memory, said memory having a plurality of communication modes, said memory controller comprising:

memory interface logic configured to interact with said memory in each of said plurality of communication modes; and memory mode change logic, in response to a memory mode change request instruction specifying a predetermined one said plurality of communication modes issued by said memory interface logic to said memory, configured to request said memory interface logic to interact with said memory in said predetermined one of said plurality of communication modes and to prevent interaction between said memory interface logic and said memory until said memory interface logic confirms that said memory interface logic is configured to interact with said memory in said predetermined one of said plurality of communication modes, wherein said plurality of communication modes includes at least a synchronous mode and an asynchronous mode and said memory interface logic comprises an interface configuration register configured to store timing parameters which configure the memory interface logic to interact with said memory in one of said synchronous mode and said asynchronous mode and a holding interface configuration register configured to store timing parameters associated with a predetermined one of said synchronous mode and said asynchronous mode, said memory mode change logic responsive to said memory mode change request instruction specifying said predetermined one of said synchronous mode and said asynchronous mode issued by said memory interface logic to said memory to request said memory interface logic to cause said timing parameters of said holding interface configuration register to transfer into said interface configuration register to cause said memory interface logic to interact with said memory in said predetermined one of said synchronous mode and said asynchronous mode.

2. The memory controller as claimed in claim 1, further comprising a buffer configured to continue to receive further instructions whilst said memory interface logic is configured to interact with said memory in said predetermined one of said plurality of communication modes.

3. The memory controller as claimed in claim 1, wherein said memory mode change logic is configured to prevent interaction between said memory interface logic and said memory by preventing communication between said memory interface logic and said memory until said memory interface logic confirms that said memory interface logic is configured to interact with said memory in said predetermined one of said plurality of communication modes.

4. The memory controller as claimed in claim 1, wherein said memory interface logic comprises said interface configuration register configured to store parameters which configure said memory interface logic to interact with said memory in one of said plurality of communication modes and said holding interface configuration register configured to store parameters associated with said predetermined one of said plurality of communication modes, said memory interface logic responsive to said request from said memory mode change logic to cause said parameters of said holding interface configuration register to transfer into said interface configuration register to cause said memory interface logic to interact with said memory in said predetermined one of said plurality of communication modes, wherein said memory interface logic is configured to provide an indication to said memory mode change logic when said parameters of said holding interface configuration register have transferred into said interface configuration register.

5. The memory controller as claimed in claim 4, wherein said memory mode change logic is configured, when said indication is provided, to re-enable interaction between said memory interface logic and said memory.

6. The memory controller as claimed in claim 1, wherein said memory interface logic comprises said interface configuration register configured to store parameters which configure said memory interface logic to interact with said memory in one of said plurality of communication modes and said holding interface configuration register configured to store parameters associated with said predetermined one of said plurality of communication modes, said memory interface logic responsive to said request from said memory mode change logic to cause said parameters of said holding interface configuration register to transfer into said interface configuration register to cause said memory interface logic to interact with said memory in said predetermined one of said plurality of communication modes, wherein said memory mode change logic is configured, on receipt of said memory mode change request instruction, to prevent said holding interface configuration register from being updated until said memory interface logic confirms that said memory interface logic is configured to interact with said memory in said predetermined one of said plurality of communication modes.

7. The memory controller as claimed in claim 1, wherein said memory mode change logic is configured to detect said memory mode change request instruction by matching a bit portion in said memory mode change request instruction.

8. The memory controller as claimed in claim 1, wherein said memory mode change logic is configured to detect said memory mode change request instruction by matching a bit portion in data associated with said memory mode change request instruction.

9. The memory controller as claimed in claim 1, wherein said memory mode change logic is configured, in response to said memory mode change request instruction specifying said predetermined one of said synchronous mode and said asynchronous mode issued by said memory interface logic to said memory, to prevent any accesses between said memory interface logic and said memory until said memory interface logic confirms that said memory interface logic is configured to communicate with said memory in said predetermined one of said synchronous mode and said asynchronous mode.

10. The memory controller as claimed in claim 1, wherein said memory mode change logic is operable, in response to said memory mode change request instruction specifying said predetermined one of said synchronous mode and said asynchronous mode issued by said memory interface logic to said memory, to prevent any further instructions issued by said memory interface logic to said memory until said memory interface logic confirms that said memory interface logic is configured to communicate with said memory in said predetermined one of said synchronous mode and said asynchronous mode.

11. The memory controller as claimed in claim 1, wherein said memory mode change logic is configured, in response to said memory mode change request instruction specifying said predetermined one of said synchronous mode and said asynchronous mode issued by said memory interface logic to said memory, to prevent any further instructions issued by said memory interface logic by preventing any instructions following said memory mode change request instruction issued from an instruction buffer to said memory interface logic until said memory interface logic confirms that said memory interface logic is configured to communicate with said memory in said predetermined one of said synchronous mode and said asynchronous mode.

12. The memory controller as claimed in claim 1, wherein said memory mode change logic is operable, in response to said memory mode change request instruction specifying said predetermined one of said synchronous mode and said asynchronous mode issued by said memory interface logic to said memory, to prevent any further data received by said memory interface logic from said memory until said memory interface logic confirms that said memory interface logic is configured to communicate with said memory in said predetermined one of said synchronous mode and said asynchronous mode.

13. The memory controller as claimed in claim 1, wherein said plurality of communication modes includes communication modes for controlling a format of memory transfers with respect to memory burst boundaries and said memory interface logic comprises said interface configuration register configured to store formatting parameters which configure the memory interface logic to interact with said memory in one of said plurality of communication modes and said holding interface configuration register configured to store formatting parameters associated with said predetermined one of said plurality of communication modes, said memory interface logic responsive to said request from said memory mode change logic to cause said formatting parameters of said holding interface configuration register to transfer into said interface configuration register to cause said memory interface logic to interact with said memory in said predetermined one of said plurality of communication modes.

14. The memory controller as claimed in claim 1, wherein said memory is a static memory.

15. A memory controller for controlling a memory, said memory having a plurality of communication modes, said memory controller comprising:
    memory interface means for interacting with said memory in any one of said plurality of communication modes; and
    memory mode change means for requesting, in response to a memory mode change request instruction specifying a predetermined one said plurality of communication modes issued by said memory interface means to said memory, said memory interface means to interact with said memory in said predetermined one of said plurality of communication modes and for preventing interaction between said memory interface means and said memory until said memory interface means confirms that said memory interface means is configured to interact with said memory in said predetermined one of said plurality of communication modes, wherein said plurality of communication modes includes at least a synchronous mode and an asynchronous mode and said memory interface means comprises an interface configuration register configured to store timing parameters which configure the memory interface means to interact with said memory in one of said synchronous mode and said asynchronous mode and a holding interface configuration register configured to store timing parameters associated with a predetermined one of said synchronous mode and said asynchronous mode, said memory mode change means responsive to said memory mode change request instruction specifying said predetermined one of said synchronous mode and said asynchronous mode issued by said memory interface means to said memory to request said memory interface means to cause said timing parameters of said holding interface configuration register to transfer into said interface configuration register to cause said memory interface means to interact with said memory in said predetermined one of said synchronous mode and said asynchronous mode.

16. A method of controlling a memory, said memory having a plurality of communication modes, said method comprising:
    (i) requesting, in response to a memory mode change request instruction specifying a predetermined one of said plurality of communication modes issued by a memory interface logic to said memory, said memory interface logic to interact with said memory in said predetermined one of said plurality of communication modes; and
    (ii) preventing interaction between said memory interface logic and said memory until said memory interface logic confirms that said memory interface logic is configured to interact with said memory in said predetermined one of said plurality of communication modes, wherein said plurality of communication modes includes at least a synchronous mode and an asynchronous mode, said method comprising:
    storing timing parameters which configure the memory interface logic to interact with said memory in one of said synchronous mode and said asynchronous mode in an interface configuration register and timing parameters associated with said predetermined one of said synchronous mode and said asynchronous mode in a holding interface configuration register; and
    transferring, in response to said memory mode change request instruction specifying said predetermined one of said synchronous mode and said asynchronous mode issued by said memory interface logic to said memory, said timing parameters of said holding interface configuration register into said interface configuration register to cause said memory interface logic to interact with said memory in said predetermined one of said synchronous mode and said asynchronous mode.

17. The method as claimed in claim 16, further comprising:
    receiving further instructions whilst said memory interface logic is configured to interact with said memory in said predetermined one of said plurality of communication modes.

18. The method as claimed in claim 16, wherein said step (ii) comprises:
    preventing communication between said memory interface logic and said memory until said memory interface logic confirms that said memory interface logic is configured to interact with said memory in said predetermined one of said plurality of communication modes.

19. The method as claimed in claim 16, comprising:
    storing parameters which configure the memory interface logic to interact with said memory in one of said plurality of communication modes in said interface configuration register and parameters associated with said predetermined one of said plurality of communication modes in said holding interface configuration register;
    transferring said parameters of said holding interface configuration register into said interface configuration register to cause said memory interface logic to interact with said memory in said predetermined one of said plurality of communication modes; and
    providing an indication when said parameters of said holding interface configuration register have transferred into said interface configuration register.

20. The method as claimed in claim 19, comprising:
    re-enabling interaction between said memory interface logic and said memory when said indication is provided.

21. The method as claimed in claim 16, comprising:
    storing parameters which configure the memory interface logic to interact with said memory in one of said plurality of communication modes in said interface configuration register and parameters associated with said predetermined one of said plurality of communication modes in said holding interface configuration register;

transferring said parameters of said holding interface configuration register into said interface configuration register to cause said memory interface logic to interact with said memory in said predetermined one of said plurality of communication modes; and preventing, on receipt of said memory mode change request instruction, said holding interface configuration register from updating until said memory interface logic confirms that said memory interface logic is configured to interact with said memory in said predetermined one of said plurality of communication modes.

22. The method as claimed in claim 16, comprising:
detecting said memory mode change request instruction by matching a bit portion in said memory mode change request instruction.

23. The method as claimed in claim 16, comprising:
detecting said memory mode change request instruction by matching a bit portion in data associated with said memory mode change request instruction.

24. The method as claimed in claim 16, comprising:
preventing, in response to said memory mode change request instruction specifying said predetermined one of said synchronous mode and said asynchronous mode issued by said memory interface logic to said memory, any accesses between said memory interface logic and said memory until said memory interface logic confirms that said memory interface logic is configured to communicate with said memory in said predetermined one of said synchronous mode and said asynchronous mode.

25. The method as claimed in claim 16, comprising:
preventing, in response to said memory mode change request instruction specifying said predetermined one of said synchronous and said asynchronous modes issued by said memory interface logic to said memory, any further instructions from said memory interface logic to said memory until said memory interface logic confirms that said memory interface logic is configured to communicate with said memory in said predetermined one of said synchronous mode and said asynchronous mode.

26. The method as claimed in claim 16, comprising:
preventing, in response to said memory mode change request instruction specifying said predetermined one of said synchronous mode and said asynchronous mode issued by said memory interface logic to said memory, any further instructions issued by said memory interface logic by preventing any instructions following said memory mode change request instruction issued from an instruction buffer to said memory interface logic until said memory interface logic confirms that said memory interface logic is configured to communicate with said memory in said predetermined one of said synchronous mode and said asynchronous mode.

27. The method as claimed in claim 16, comprising:
preventing, in response to said memory mode change request instruction specifying said predetermined one of said synchronous mode and said asynchronous mode issued by said memory interface logic to said memory, any further data received by said memory interface logic from said memory until said memory interface logic confirms that said memory interface logic is configured to communicate with said memory in said predetermined one of said synchronous mode and said asynchronous mode.

28. The method as claimed in claim 16, wherein said plurality of communication modes includes communication modes for controlling a format of memory transfers with respect to memory burst boundaries, said method comprising:
storing formatting parameters which configure the memory interface logic to interact with said memory in one of said communication modes in said interface configuration register and formatting parameters associated with said predetermined one of said communication modes in said holding interface configuration register; and transferring, in response to said memory mode change request instruction specifying a predetermined one of said communication modes issued by said memory interface logic to said memory, said formatting parameters of said holding interface configuration register into said interface configuration register to cause said memory interface logic to interact with said memory in said predetermined one of said communication modes.

29. The method as claimed in claim 16, wherein said memory is a static memory.

* * * * *